United States Patent
Aksamít et al.

(10) Patent No.: US 10,249,122 B1
(45) Date of Patent: Apr. 2, 2019

(54) METHOD FOR CONTROLLING ACCESS IN A SYSTEM COMPRESSING A PORTABLE DEVICE ASSOCIATED WITH A USER AND AN ACCESS CONTROL DEVICE

(71) Applicant: Axis AB, Lund (SE)

(72) Inventors: Jan Aksamít, Prague (CZ); Petr Cernín, Prague (CZ)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/168,435

(22) Filed: Oct. 23, 2018

(30) Foreign Application Priority Data

Oct. 27, 2017 (EP) ..................................... 17198736

(51) Int. Cl.
| | |
|---|---|
| *H04W 52/02* | (2009.01) |
| *G07C 9/00* | (2006.01) |
| *G01S 5/02* | (2010.01) |
| *G01S 11/06* | (2006.01) |

(52) U.S. Cl.
CPC ........ *G07C 9/00309* (2013.01); *G01S 5/0226* (2013.01); *G01S 11/06* (2013.01); *G07C 2009/00317* (2013.01); *G07C 2009/00769* (2013.01); *G07C 2209/61* (2013.01)

(58) Field of Classification Search
None
See application file for complete search history.

(56) References Cited

U.S. PATENT DOCUMENTS

| | | | | |
|---|---|---|---|---|
| 6,034,617 A * | 3/2000 | Luebke | ............. | G07C 9/00309 307/10.2 |
| 6,236,333 B1 * | 5/2001 | King | .................... | B60R 25/2036 340/10.1 |
| 6,396,412 B1 * | 5/2002 | Banas | .................... | B60R 25/246 340/426.35 |
| 6,570,486 B1 * | 5/2003 | Simon | ..................... | B60R 25/04 307/10.2 |
| 7,024,233 B2 * | 4/2006 | Ali | ........................ | A61B 5/1455 600/323 |
| 8,681,736 B2 * | 3/2014 | Nader | ............. | H04W 36/00837 370/331 |

(Continued)

FOREIGN PATENT DOCUMENTS

DE 102006037237 A1 2/2008

OTHER PUBLICATIONS

European Search Report for European Application No. 17198736.5 dated May 11, 2018 (10 pages).

*Primary Examiner* — Tuan A Tran
(74) *Attorney, Agent, or Firm* — Volpe and Koenig, P.C.

(57) ABSTRACT

A method for controlling access in a system comprising a portable device associated with a user and an access control device, includes the portable device and the access control device being configured to wirelessly communicate with each other, the method comprising: pairing the portable device and the access control device, upon the portable device detecting proximity to the access control device, determining at the portable device a signal strength over time of a signal received from the access control device, comparing the determined signal strength over time with a previously determined reference signal strength profile, and upon the determined signal strength over time being considered congruent with the reference signal strength profile, controlling the access control device.

14 Claims, 7 Drawing Sheets

(56) References Cited

U.S. PATENT DOCUMENTS

| | | | |
|---|---|---|---|
| 8,792,826 B2 | 7/2014 | Willis | |
| 9,193,331 B2 * | 11/2015 | Endo | B60R 25/2045 |
| 9,251,693 B2 * | 2/2016 | Edwards | G08B 21/22 |
| 9,762,470 B2 * | 9/2017 | Alam | H04L 43/0811 |
| 10,117,252 B2 * | 10/2018 | Wei | H04W 72/048 |
| 10,158,719 B2 * | 12/2018 | Khan | H04W 4/40 |
| 10,165,440 B2 * | 12/2018 | Smith | H04L 63/0492 |
| 2002/0024427 A1 * | 2/2002 | Banas | B60R 25/246 340/425.5 |
| 2006/0091997 A1 * | 5/2006 | Conner | B60R 25/1003 340/5.64 |
| 2006/0136997 A1 | 6/2006 | Telek et al. | |
| 2007/0024121 A1 * | 2/2007 | Teshima | B60R 25/245 307/10.2 |
| 2010/0075656 A1 * | 3/2010 | Howarter | B60R 25/2009 455/420 |
| 2010/0076622 A1 * | 3/2010 | Dickerhoof | B60R 25/24 701/2 |
| 2010/0245038 A1 * | 9/2010 | Ghabra | G07C 9/00309 340/5.61 |
| 2010/0271171 A1 * | 10/2010 | Sampei | B60R 25/00 340/5.6 |
| 2010/0304690 A1 * | 12/2010 | Proefke | B60R 25/24 455/69 |
| 2011/0183601 A1 * | 7/2011 | Hannon | B60K 35/00 455/1 |
| 2012/0092129 A1 * | 4/2012 | Lickfelt | B60R 25/24 340/5.72 |
| 2012/0158214 A1 * | 6/2012 | Talty | B60R 25/24 701/2 |
| 2012/0268242 A1 * | 10/2012 | Tieman | B60R 25/24 340/5.61 |
| 2013/0110318 A1 * | 5/2013 | Colja | H02J 5/005 701/2 |
| 2013/0143594 A1 * | 6/2013 | Ghabra | H04W 24/00 455/456.1 |
| 2013/0157574 A1 * | 6/2013 | Craine | H04M 1/72577 455/41.2 |
| 2013/0342379 A1 * | 12/2013 | Bauman | G01S 13/0209 342/21 |
| 2014/0379175 A1 | 12/2014 | Mittermeier | |
| 2016/0063786 A1 * | 3/2016 | Lewis | B60R 25/24 340/5.72 |
| 2017/0301166 A1 | 10/2017 | Earles et al. | |
| 2018/0302859 A1 * | 10/2018 | Elangovan | H04W 52/0235 |

* cited by examiner

METHOD FOR CONTROLLING ACCESS IN A SYSTEM COMPRESSING A PORTABLE DEVICE ASSOCIATED WITH A USER AND AN ACCESS CONTROL DEVICE

TECHNICAL FIELD

The present invention relates to a method for controlling access in a system comprising a portable device associated with a user and an access control device.

BACKGROUND

U.S. Pat. No. 8,792,826 B1 discloses a method for determining proximity between radio frequency devices and controlling switches using the analysis of a series of received signal strength indicator (RSSI) values. It further relates to a method for the control of a switch based on the proximity of the radio frequency devices. It is disclosed that the switch may be used to change the state of a door lock from locked to unlocked. Different so-called technical indicators are also disclosed that are used to determine the proximity.

However, the method disclosed in U.S. Pat. No. 8,792,826 may lead to a number of situations where the proximity of radio frequency devices to the switch will trigger a reaction although it was not the intention of the user. A car door may e.g. unintentionally be opened when a user passes in the vicinity of the car in a garage. Similarly, a door lock in an office space may e.g. unintentionally be opened when a user passes by his/her office in the corridor.

Thus, there is still room for improvements when it comes to providing a method for controlling access in a system comprising a portable device associated with a user and an access control device.

SUMMARY OF THE INVENTION

Mitigating, alleviating or eliminating one or more of the above-identified deficiencies in the art and disadvantages singly or in any combination and solve at least the above mentioned problem is set forth herein.

In view of the above, the teachings herein provide a method for controlling access in a system comprising a portable device associated with a user and an access control device. The method may be used to address the issue of unintentional triggering of the access control device and still being capable of triggering the access control device well in advance of the user's approach to the object controlled by the access control device, thereby avoiding or at least reducing undesirable delay or waiting time for the user.

A method for controlling access in a system comprising a portable device associated with a user and an access control device, includes the portable device and the access control device configured to wirelessly communicate with each other, the method comprising:

pairing the portable device and the access control device, upon the portable device detecting proximity to the access control device, determining at the portable device a signal strength over time of a signal received from the access control device, comparing the determined signal strength over time with a previously determined reference signal strength profile, and upon the determined signal strength over time being considered congruent with the reference signal strength profile, controlling the access control device.

By determining the signal strength over time and by comparing the determined signal strength over time with one or more previously determined reference signal strength profiles it is possible to e.g. differentiate between a first situation where a user is approaching his office door with the intention to enter into the office space and a second situation where the user is approaching his office door with the intention to go past it in the corridor. Although the actual resulting proximity may be the same, the profile of the signal strength over time may indicate a difference in the user's approach to the door. In case the determined signal strength over time being considered congruent with the reference signal strength profile associated with the user approaching the access control device with an intention to e.g. open the door, the access control device is controlled to provide access. In case the determined signal strength over time being considered congruent with the reference signal strength profile associated with the user passing the access control device, the access control device is controlled not to provide access.

The portable device may thereby control the access control device in a more reliable manner.

The method further allows for more efficient control of the access control device. This as the determined congruency between the signal strength over time and the reference signal strength profile allows for the utilization of the movement pattern of the user to control the access control device as the user is approaching the access control device. The method may thereby take advantage of how the user moves when approaching the access control device.

Constraints on the access control device are further reduced as the access control device is controlled by the portable device. A less sophisticated access control device may thereby be used. A more economically viable access control device is further provided.

Put differently, the action of comparing the determined signal strength over time with a previously determined reference signal strength profile, and the action of determining congruency of the determined signal strength over time and the reference signal strength profile are performed by the portable device. The method therefore offers an affordable alternative, i.e. functionality may be provided via the portable device which otherwise would require a more complex access control device.

The wording "the signal strength over time being considered congruent with the reference signal strength profile" may be understood as the two having essentially the same size and/or shape. In other words, there is considered a similarity between the variation of the signal strength over time and the variation of the reference signal strength profile. Congruency may, for example, be determined by a correlation, a cross correlation, a minimum deviation or by comparing the integrals of the signal strength over time and the reference signal strength profile ("area under the curves"). The determined signal strength over time and the determined reference signal strength profile may be considered congruent if the difference between the two is smaller than a predetermined value. For example, the difference may be calculated by comparing the integrated signals over time. The predetermined value may, for example, be within the range 10-20% of the integrated signal over time. Thus, there may be an agreement within 80-90% between the predetermined value and the integrated signal over time.

It may be said that the method allows for control of an access control device by an identified characteristic movement pattern associated with the user. The method utilizes the signal strength profile of the portable device of the user to determine the movement pattern of the user as the user approaches the access control device. The similarity between the determined movement pattern of the user and a stored movement pattern is further used to identify the user and for controlling the access control device. Moreover, by using a profile rather than simply the proximity, it is possible to provide a more accurate timing for controlling the access control device by controlling the access control device based on the reference signal strength profile.

This may, e.g., be performed by controlling of the access control device at a predetermined point in time relative to the reference signal strength profile. Thereby, for instance, a door may begin to open before the user reaches the door and the user may thereby pass the door without having to wait or slow down at all or at least not to any significant extent. Even though the door is not automatically being opened, it may e.g. be useful if the user hears an audible confirmation or sees a visual confirmation that the door is unlocked before he/she comes into contact with the door to push or pull it open.

The method may further comprise: upon the user changing state of the access control device, recording or updating at the portable device at least a portion of the determined signal strength over time as a reference signal strength profile.

This may be used as an automatic manner of initially providing the reference signal strength profile or continuously updating the reference signal strength profile. If it is the first time the access control device is approached and there is no pre-stored standard reference signal strength profile, the user changing the state of the access control device may trigger recording at the portable device at least a portion of the determined signal strength over time as a reference signal strength profile. The next time the user approaches an access control device, the user's approach may be compared with the thus recorded reference signal strength profile. It may be noted that the determined signal strength may be subjected to filtering or other kinds of data processing before being used as a reference signal strength profile. This may e.g. be noise reduction. It may also be used to provide a reference signal strength profile being mathematically easy to handle in later comparisons or being memory efficient to store. Thus, the recording or updating of at least a portion of the determined signal strength over time as a reference signal strength profile may be a representation of the portion of determined signal strength over time.

The changing of the state of the access control device may e.g. be an unlocking of the access control device. It may be noted that changing the state of the access control device may also be the actual opening of an object device, such as a door, controlled by the access control device. It may also be noted that the opposite may also be useful. A lack of actual opening of an object device, such as a door, may in case a congruence has been determined be used as a trigger to discard, update or question the validity of the predetermined reference signal strength profile.

If the user approaches the access control device and changes the state of the access control device, this change of state may be used to trigger an update of the reference signal strength profile. The update may be performed both in case a congruence with the previously determined reference signal strength profile has been achieved or not. The update may e.g. be used to identify those parts of the movement patterns that are common to the different occasions and those parts of the movement patterns that often varies with the different occasions. Thereby, it becomes possible to assert different weights or different tolerances to different parts of the reference signal strength profile when making the determination concerning if there is a congruence or not.

By further taking account of previous movement patterns of the user relative to the access control device, an improved control of the access control device may be obtained. A state of the access control device may further be controlled when the user reaches the access control device. As an example, the access control device may be a door lock and the door may be opened as the user reaches the door. A more efficient opening of the door may thereby be achieved without the need of the user actively opening the door.

In other words, the recording or updating at the portable device a representation of a portion of the determined signal strength over time as a reference signal strength profile allows for identification of a characteristic behavior, e.g. movement of the user when approaching the access control device.

The congruency may be determined by determining if the signal strength over time is within a predetermined tolerance band over time relative to the reference signal strength profile. It may be noted that the tolerance band may be related to the signal strength in absolute terms or in relative terms or a combination thereof. It may be noted that the tolerance bands may be chosen to allow for different degree of deviation at different time segments of the reference signal strength profile. It may be noted that the method of using tolerance bands may be designed to allow for deviating or strange values to be ignored when determining if the determined signal strength over time is considered congruent with the reference signal strength profile or not.

The method may further comprise: setting the portable device in a calibration mode previous to determining at the portable device a signal strength over time of a signal received from the access control device.

The use of the calibration mode opens up for a controlled learning procedure in which the user's movement pattern may be identified in an efficient manner. The method thereby allows for an efficient mapping of the movement of the user when the user approaches the access control device. A more reliable determination of the reference signal strength profile may further be achieved. A faster determination of the reference signal strength profile may also be achieved. The recording of the reference signal strength profile may be triggered by the user changing state of the access control device.

The method may further comprise: while being in the calibration mode, at a plurality of occasions, upon the user changing state of the access control device, recording or updating at the portable device at least a portion of the determined signal strength over time as a reference signal strength profile. This way, a reliable determination of the reference signal strength profile may be achieved. The calibration mode may be ended automatically in response to a predetermined number of occasions or in response to an agreement of the reference signal strength profile determined at different occasions.

The recorded or updated reference signal strength profile may be a representation of the, at the plurality of occasions, determined signal strengths over time. The representation may e.g. be an average or a weighted average of the actually determined, and optionally data processed, signal strength over time.

The method may further comprise, after a predetermined number of occasions setting a reference signal strength profile to be used when comparing the determined signal strength over time with a previously determined reference signal strength profile. This is a robust manner of providing reference signal strength profile. The method may also take advantage of that the user has approached the access control device at a plurality of occasions. It is also user friendly since the user may be informed upfront that he/she is required to do this procedure a predetermined number of times before a reference is determined. Thereby a reference signal strength profile with improved representativeness to the movement of the user may be obtained. As mentioned averaging or weighted averaging may be used when determining the reference signal strength profile. It may be noted that this method with a predetermined number of occasions may be complemented with a future on-going or periodic automatic update triggered by the user changing the state.

The method may further comprise: after a predetermined number of occasions, setting a tolerance band over time relative to the reference signal strength profile, to be used when considering congruency of the determined signal strength over time and a previously determined reference signal strength profile. This is a robust manner of setting a tolerance band over time. The method takes advantage of that the user has approached the access control device at a plurality of occasions. It is also user friendly since the user may be informed upfront that he/she is required to do this procedure a predetermined number of times before a reference is determined. Thereby a reference signal strength profile and tolerance bands with improved representativeness to the movement of the user may be obtained.

The method may further comprise: in response to differences between reference signal strength profiles determined at different occasions being less than a predetermined tolerance band, setting a reference signal strength profile to be used when considering congruency of the determined signal strength over time and a previously determined reference signal strength profile. With this method it is possible to provide a dynamic provision of reference signal strength profiles. This may be considered to be a method in which calibration mode is ended when there is a sufficient agreement of the reference signal strength profile determined at different occasions.

The comparison of the determined signal strength over time with a previously determined reference signal strength profile may include a comparison of first time derivatives of the determined signal strength over time and the reference signal strength profile. The use of first time derivatives in the comparison may e.g. be used to take into account different approach speeds while still identifying a congruence in the behavior.

The comparing the determined signal strength over time with a previously determined reference signal strength profile may include a comparison of second time derivatives of the determined signal strength over time and the reference signal strength profile. The use of second time derivatives may e.g. be used in a prediction of the time of arrival for the user at the access control device. Second time derivatives may also be used to quickly identify changes in the trend of the movement of the user.

The method may further comprise:

upon the portable device detecting proximity to the access control device, determining at the portable device a sensor signal from an auxiliary sensor of the portable device over time, upon the user changing state of the access control device, recording or updating at the portable device at least a portion of the determined sensor signal from the auxiliary sensor over time as an auxiliary reference signal profile, wherein comparing the determined signal strength over time with a previously determined reference signal strength profile is performed in combination with comparing the determined sensor signal from the auxiliary sensor over time with a previously determined auxiliary signal reference profile, and upon the signal strength over time being considered congruent with the reference signal strength profile, and the sensor signal from the auxiliary sensor over time being considered congruent with the auxiliary signal reference profile, controlling the access control device.

Input from additional sensor signals, such as a gyroscope or an accelerometer, may be used to specify the movement of the user of the portable device. Data pertaining to the signal strength in combination with data pertaining to the auxiliary sensor signal may be used to control the access control device. This movement pattern may be used to obtain a more accurate timing for controlling the access control device. The gyroscope may e.g. be used to more clearly identify the user's intention e.g. when it comes to entering or passing by a door. A gyroscope or an accelerometer may e.g. quickly and clearly identify that the user is turning towards the door.

The auxiliary sensor may e.g. be a gyroscope, an accelerometer, or a GPS sensor.

The wireless communication between the portable device and the access control device may e.g. be performed via Bluetooth, Zigbee, Wifi, Radio-frequency identification, RFID, and/or Near field communication, NFC.

The portable device may e.g. be a mobile phone, a tablet, a key fob, a smart watch, or a smart bracelet.

The access control device may e.g. be a door lock, a car door lock, a window lock, a lock for a storage compartment, an entrance or exit boom at a car park, etc. The storage compartment may for example be a fridge, or a freezer, a gas supply etc.

The signal strength over time of a signal received from the access control device may e.g. be a received signal strength indicator, RSSI, or Received Channel Power Indicator, RCPI.

A further scope of applicability of the present teachings will become apparent from the detailed description given below. However, it should be understood that the detailed description and specific examples, while indicating preferred embodiments, are given by way of illustration only, since various changes and modifications within the scope of the teachings will become apparent to those skilled in the art from this detailed description.

Hence, it is to be understood that the teachings are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects will now be described in more detail, with reference to appended drawings showing different embodiments. The figures should not be considered limiting to the specific embodiment; instead they are used for explaining and understanding the teachings.

As illustrated in the figures, the sizes of layers and regions are exaggerated for illustrative purposes and, thus, are provided to illustrate the general structures of embodiments. Like reference numerals refer to like elements throughout.

DETAILED DESCRIPTION

Figure 1:
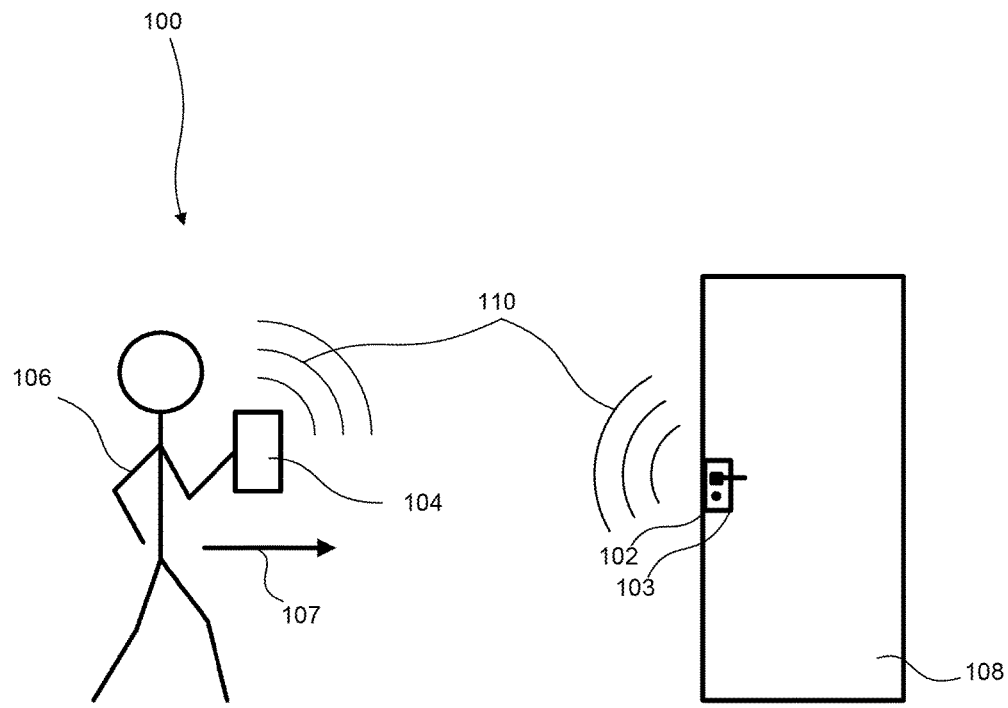
FIG. 1 illustrates a system comprising the portable device and an access control device.

The present teachings will now be described more fully hereinafter with reference to the accompanying drawings, in which currently preferred embodiments are shown. The teachings may, however, be embodied in many different forms and should not be construed as limited to the embodiments set forth herein; rather, these embodiments are provided for thoroughness and completeness, and to fully convey the scope of the teachings to the skilled person.

In the following, with reference to FIGS. 1 and 2, a system 100 facilitating control of an access control device 102 by an identified characteristic movement pattern of a portable device 104 associated with a user 106 is described. More specifically, the system 100 utilizes a recorded signal strength over time of a signal received from the access control device 102 to determine the movement pattern of the user 106 as the user 106 approaches 107 the access control device 102. The system 100 allows for triggering of the access control device 102 well in advance of the user's 106 approach to the access control device 102. The system 100 thereby allows for an improved control of the access control device 102. The system 100 avoids or at least reduces undesirable delay or waiting time for the user. Unintentional triggering of the access control device is further mitigated.

FIG. 1 illustrates the system 100 comprising the portable device 104 and the access control device 102. The access control device 102 is exemplified as a door-lock 103. The door-lock 103 is arranged on a door 108. In the following, the control of the access control device 102 is exemplified as an unlocking of the door 108. The door 108 may be opened automatically in response to the unlocking. Easy passage through the unlocked door may thereby be achieved by the system as will be discussed below.

The portable device 104 may be a mobile communication device such as a mobile phone or a tablet.

The portable device 104 is associated with a user 106. The association may be via the portable device 104 requiring a user identification, ID. The user identification may, for example, comprise a touch based ID or a PIN code lock.

The portable device 104 and the access control device 102 may each comprise a memory 112 for storing information. The memory 112 of the portable device 104 may store information pertaining to the user identification.

The portable device 104 and the access control device 102 are further configured to wirelessly communicate 110 with each other. The portable device 104 may pair 111 with the access control device 102. The pairing 111 occurs to establish a connection between two devices 102, 104.

The pairing may be initiated by the portable device, e.g. by the user selecting an access device from a list of access control devices on the portable device. The pairing may comprise an authentication procedure. The authentication procedure may comprise an authentication via entering, at the portable device, a security code. The security code may be a password or a pin code. The authentication may be achieved by the portable device capturing an image of the access control device. An identification of the control access device may thereby be obtained.

The authentication may be achieved via QR code, a barcode or a text. The QR code, the barcode or the text may be arranged at the access control device or adjacent to the access control device. Hence, a visual indication may be used to establish an authentication.

A camera of the portable device may be configured to image the control access device or the QR code, the barcode, or the text associated with the control access device.

A camera of the portable device may be configured to authenticate the access control device via the QR code, the barcode, or the text associated with the control access device.

The portable device may select a previously determined reference signal strength profile based on the authenticated access control device.

The portable device may alternatively select a previously determined reference signal strength profile based on a selected access control device.

A record of information comprising data pertaining to the connection may further be stored in the memory of at least one of the respective devices 102, 104. Either memory 112 may be configured for storing information pertaining to the pairing.

The wording wireless communication should be understood as transfer of information or power between the two devices not being connected by an electrical conductor. The portable device 104 and the access control device 102 may, respectively, comprise a communication unit 114 for providing the wireless communication 110. The wireless communication may be via Bluetooth.

The portable device 104 and the access control device 102 may each further comprise a processor 116. The processor 116 may, for example, be a microcontroller configured to process data received or transmitted by the communication units 114 of the portable device 104 and the access control device 102, respectively. The processor 116 of the portable device 104 may further be configured to process data pertaining to a signal strength over time of a signal received from the access control device 102.

Next a method 200 for controlling access in the system 100 comprising a portable device 104, associated with the user 106, and an access control device 102 is described, see FIGS. 3, 4a, 4b and 5 for reference.

Figure 4A:
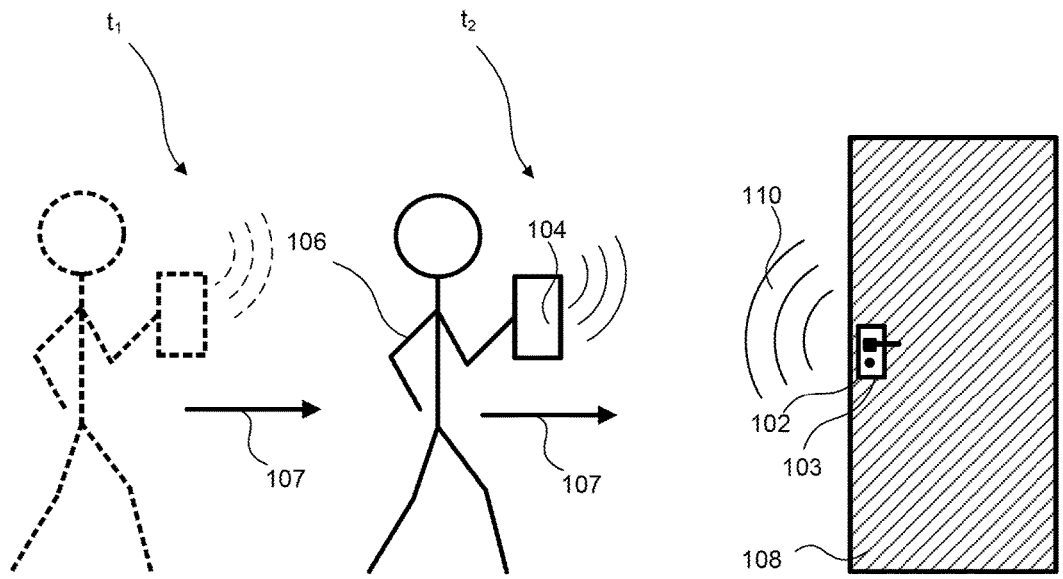
FIG. 4a illustrates a user at a first point in time and in a second point in time as the user approaches an access control device in the form of a door lock for a door.
Figure 4B:
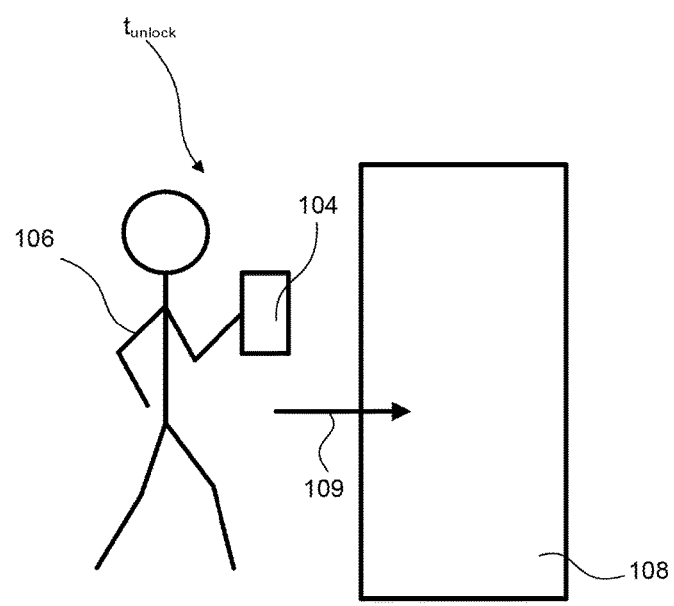
FIG. 4b illustrates the user of FIG. 4a passing through an open door.

FIG. 4a illustrates a user 106 at a first point in time $t_1$ and in a second point in time $t_2$ as the user 106 approaches 107 an access control device 102 in the form of a door-lock 103 of a door 108. The door 108 is in a locked state. The user 106 carries the portable device 104 which receives a signal 110 (over time) transmitted from the access control device 102 to the portable device 104.

Figure 3:
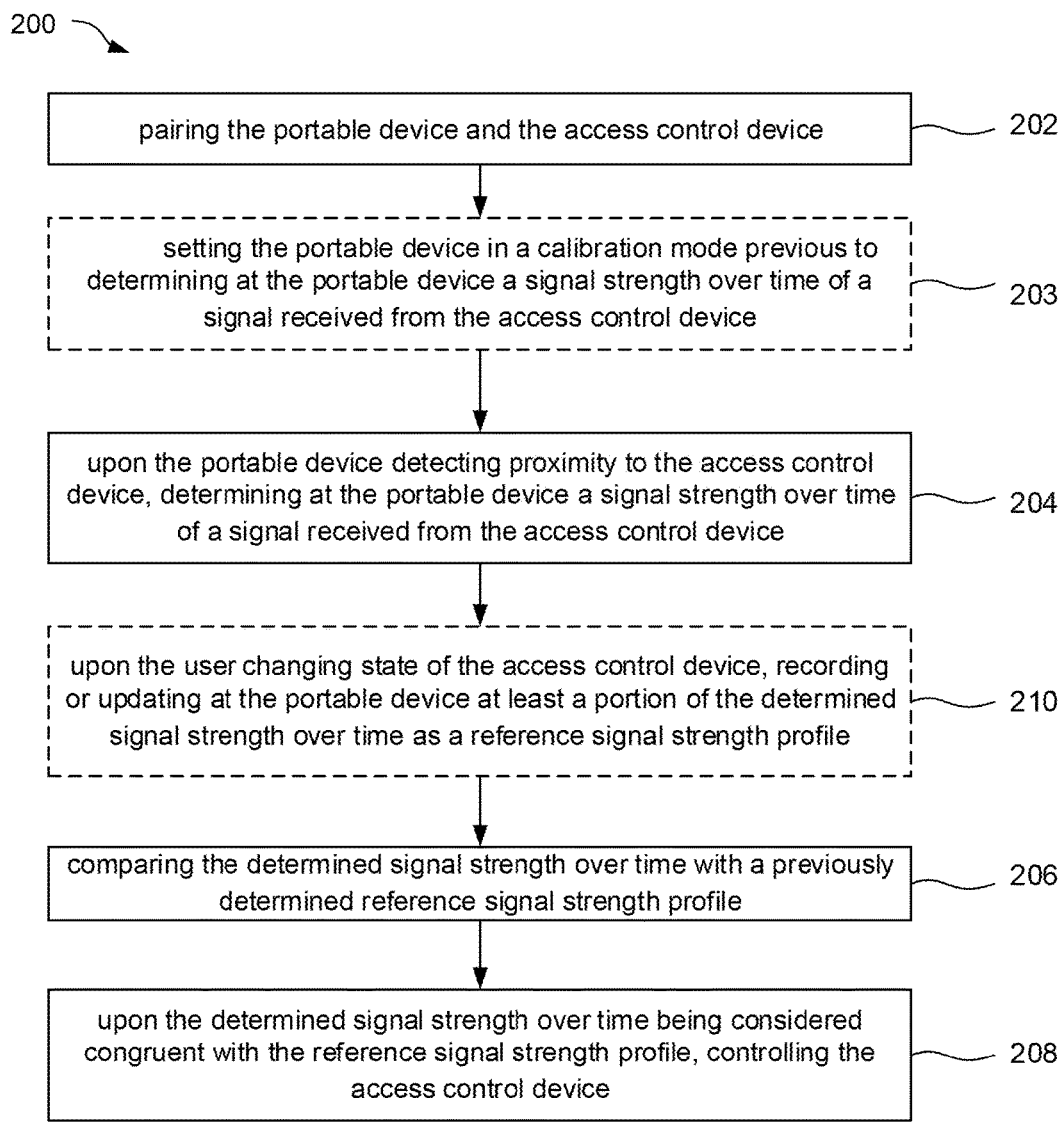
FIG. 3 is a block scheme of a method for controlling access in a system comprising the portable device.

With reference to FIG. 3, the method 200 comprises pairing 202 the portable device 104 and the access control device 102. The paring 202 is in this example assumed to occur prior to the first point in in time $t_1$.

Upon the portable device 104 detecting proximity to the access control device 102, the method further comprises determining 204 at the portable device 104 the signal strength over time of a signal received from the access control device 102.

Figure 5:
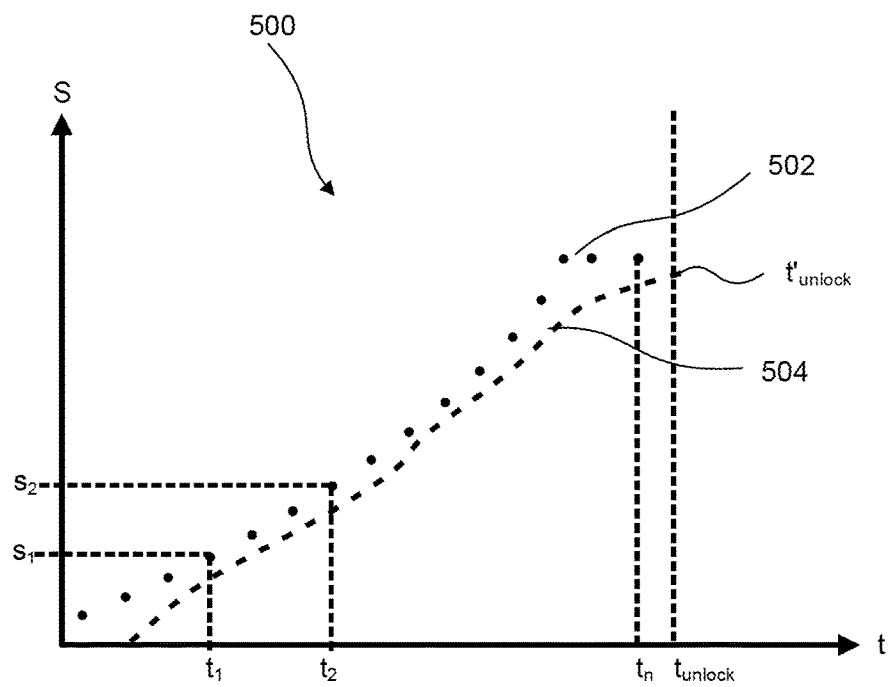
FIG. 5 illustrates a diagram of determined received signal strength as a function of time.

FIG. 5 illustrates a diagram 500 of determined received signal strength, S, as a function of time, t. With reference to FIGS. 5 and 4a, the determined signal strength over time 502 is plotted in the diagram 500. At the first point in time $t_1$ a signal strength of $S_1$ is determined at the portable device 104 and at a second point in time a signal strength of $S_2$ is determined at the portable device 104. $S_2$ is here larger than $S_1$ as the user is closer to the access control device 102 at the second point in time such that the signal strength is increased. The determined signal strength over time 502 may be understood as a measure of how a given user approaches the access control device controlling the door 108. In other words, the determined signal strength over time 502 may be understood as a movement pattern that is characteristic for the user i.e. as a signature or fingerprint which is specific for a given user.

The method 200 further comprises comparing 206 the determined signal strength over time 502 with a previously determined reference signal strength profile 504. The previously determined reference signal strength profile 504 is illustrated in FIG. 5 as rectangles.

From the comparison it is possible to extract information on how the user 106 is approaching the door 108. The method 200 thereby allows for control of an access control device 102 by an identified characteristic movement pattern associated with the user 106. Thus, the access control device 102 may be controlled when the determined signal strength over time 502 is considered congruent with the reference signal strength profile 504. Congruency may, for example, be determined by a correlation, a cross correlation, a minimum deviation or by comparing the integrals of the determined signal strength over time 502 and the reference signal strength profile 504.

The controlling 208 of the access control device 102 may be by changing a state of the access control device 102. The change of state may be to unlock the door 108. This is illustrated in the FIGS. 4a and 4b. More specifically, the signal strength over time 502 is determined as well as compared to the reference signal strength profile 504 as the user approaches 107 the door 108. The measurement points from the first point in time $t_1$ to the n:th point in time $t_n$ illustrate the determined signal strength over time 502, see the circular markers in FIG. 5.

If the determined signal strength over time 502 is considered congruent with the reference signal strength profile 504 the state of the control access device 102 may be changed such that the door 108 in unlocked. The door may further be automatically opened such that the user may pass 109 through the open door 108 in an efficient manner, see FIG. 4b.

The controlling of the access control device 102 may further be at a predetermined point in time, $t_{unlock}$, relative to the reference signal strength profile 504. Thereby, e.g. a door may begin to open before the user reaches the door and the user may thereby pass the door without having to wait or slow down at all or at least not to any significant extent. An improved passage of the door 108 is thereby achieved by the method 200.

Trends in the signal strength over time may alternatively be used to derive the predetermined point in time.

The method 200 may further comprise upon the user changing state of the access control device, recording or updating 210 at the portable device at least a portion of the determined signal strength over time as a reference signal strength profile.

The point in time at which the user changes the state of the access control device thereby triggers recording or updating of a reference signal strength profile. Thus, the method utilizes the signal strength profile of the portable device of the user to record or update a movement pattern of the user as the user approaches the access control device. The similarity of the determined movement pattern of the user to a stored movement pattern, i.e. the reference signal strength profile, may then be used to identify the user and for controlling the access control device. The controlling of the access control device may thereby be tailored to fit the movement characteristics of a specific individual.

Figure 6:
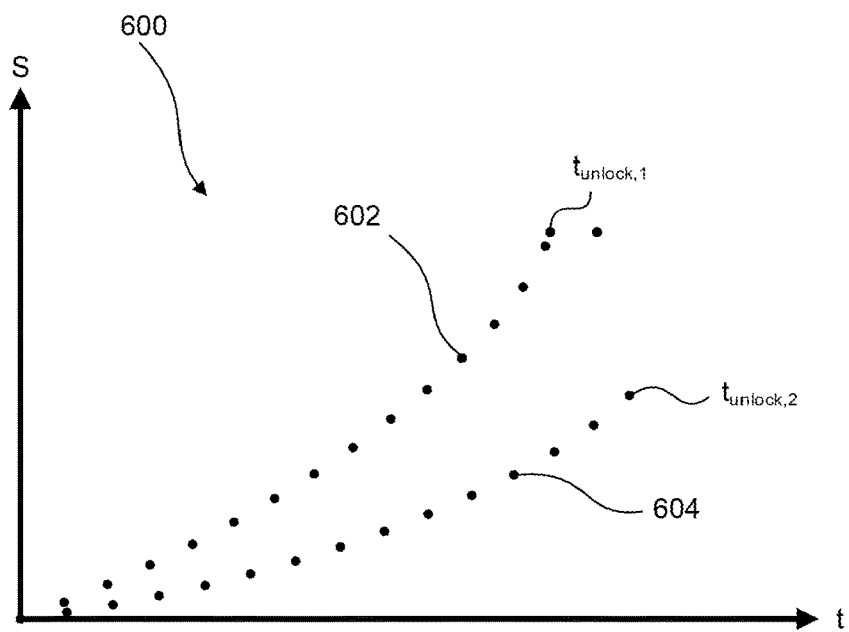
FIG. 6 illustrates a diagram of determined received signal strength as a function of time.

FIG. 6 illustrates a diagram 600 of determined received signal strength, S, as a function of time, t, for a first 602 user and a second 604 user. It is notable in this example that the first user 602 approaches the access control device 102 with a faster speed than the second user 604, but then comes to a halt near the access control device 102. The movement patterns of the two users thereby differ and may be used to identify the users as well as to determine an individualized point in time for controlling the control access device 102. Assuming that the two determined received signal strengths over time 602 and 604 are updated or recorded as two reference signal strength profiles these may then be used for controlling of the access control device 102 at a predetermined point in time, $t_{unlock}$, relative to the respective reference signal strength profiles. By way of example, the controlling of the access control device 102 a predetermined point in time for the first user may occur at time $t_{unlock, 1}$, whereas the controlling of the access control device 102 a predetermined point in time for the second user may occur at time $t_{unlock, 2}$.

The changing state of the access control device may be achieved by the user deliberately changing the state of the access control device. Thus, the user changing the state of the access control device 102 may trigger a recording at the portable device at least a portion of the determined signal strength over time as a reference signal strength profile. To this end, the changing of the state of the access control device may e.g. be an unlocking of for instance a door lock. The unlocking may be by the user physically unlocking the door by key or key code or by the portable device sending a signal triggering the unlocking, i.e. changing the state of the access control device.

By way of example, the changing state of the access control device by the user may be recorded to occur at time $t'_{unlock}$, see FIG. 5. The point in time $t'_{unlock}$ may then be used as the predetermined point in time, $t_{unlock}$, relative to the reference signal strength profile 504, at which the controlling of the access control device 102 occurs. The predetermined point in time may alternatively be offset in time relative to the point in time at which the user changes the state of the access control device. The offset may be positive or negative in relation to the point in time at which the user changes the state of the access control device. An improved flexibility in setting the point in time at which the access control device is changed is thereby achieved.

Figure 7:
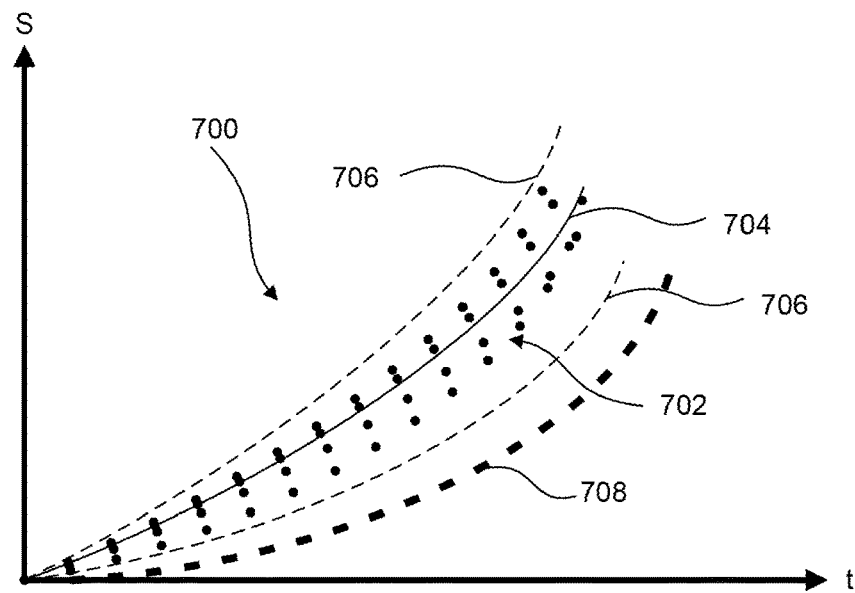
FIG. 7 illustrates a diagram of determined received signal strength as a function of time.

FIG. 7 illustrates a diagram 700 of determined received signal strength, S, as a function of time, t for a plurality of recordings or updates. FIG. 7 further exemplifies a case where four different recordings have been made represented by the measurement points 702. A reference signal strength profile 704 and a predetermined tolerance band over time 706 are also illustrated in FIG. 7, by the solid and dashed lines, respectively. The predetermined tolerance band over time 706 has been set relative to the reference signal strength profile 704. By utilizing the predetermined tolerance band over time the congruency may be determined. Thus congruency may be determined by determining if the signal strength over time 702 is within the predetermined tolerance band over time 706 relative to the reference signal strength profile 704.

More specifically, the measurement points 702 illustrate four different movement patterns recorded for a user approaching the access control device. The measurement points 702 further lie within the predetermined tolerance band 706 whereby congruency may be determined. An advantage of utilizing the condition of the signal strength over time being within a predetermined tolerance band over time relative to the reference signal strength profile is that it enables an identification of the user which may be used to ensure that a correct or certified user controls the access control device. In this case, all four movement patterns 702 may be correlated to a single user. In FIG. 7 a further determined received signal strength as a function of time is also illustrated by the rectangles 708. In contrast to the measurement points 702, the further determined received signal strength as a function of time 708 lies at least partly outside the predetermined tolerance band 706 whereby it may be deduced that the further determined received signal strength as a function of time is related to a second user. The second user may be determined not to be a certified user for controlling the access control device. In other words, even if the second user uses the same portable device as the first user control of the access control device may be denied if the movement pattern for the second used is considered, by the portable device, to deviate from the movement pattern of the first user, i.e. there is a deviation of the determined signal strength over time. A more reliable controlling of the access control device may thereby be achieved.

The method may further comprise setting 203 the portable device 104 in a calibration mode previous to determining 204 at the portable device 104 a signal strength over time of a signal received from the access control device 102.

To this end, the method may further comprise, while being in the calibration mode, at a plurality of occasions, upon the user changing state of the access control device, recording or updating at the portable device the determined signal strength over time as a reference signal strength profile.

The use of the calibration mode opens up for a learning procedure in which the user may be efficiently identified. The method thereby allows for an efficient mapping of the movement of the user when the user approaches the access control device. A more reliable determining of the reference signal strength profile is further achieved. The recording of the reference signal strength profile is further triggered by the user changing state of the access control device.

The recorded or updated reference signal strength profile may be a representation of the, at one occasion, determined signal strengths over time.

The recorded or updated reference signal strength profile may alternatively be a representation of the, at the plurality of occasions, determined signal strengths over time. Thus, representation may e.g. be an average or a weighted average of the actually determined, and optionally data processed, signal strength over time.

For example, the four different determined signal strength over time indicated by the measurement points 702 in FIG. 7 may be averaged in order to provide a reference signal over time.

The reference signal strength may be recorded or updated after a plurality of occasions upon which the determined signal strength over time has been considered congruent with the reference signal strength profile. The recorded or updated reference signal strength profile may thereby be a representation of the, at the plurality of occasions. determined or updated determined signal strengths over time. The representation may comprise averaging or filtering. Thus, the reference signal strength may be recorded or updated after the access control device has been controlled one or more times.

The method may further comprise, after a predetermined number of occasions setting a reference signal strength profile to be used when comparing the determined signal strength over time with a previously determined reference signal strength profile. A learning procedure may thereby be established. An update of the reference signal profile is further possible.

The method may further comprise, after a predetermined number of occasions setting a tolerance band over time relative to the reference signal strength profile, to be used when considering congruency of the determined signal strength over time and a previously determined reference signal strength profile.

The method may further comprise, in response to differences between reference signal strength profiles determined at different occasions being less than a predetermined tolerance band, setting a reference signal strength profile to be used when considering congruency of the determined signal strength over time and a previously determined reference signal strength profile.

A procedure for ending the calibration mode of the method is thereby provided. That is the calibration mode is ended when there is a sufficient agreement of the reference signal strength profile determined at different occasions. The method thereby provides a more reliable reference signal profile.

The comparison of the determined signal strength over time with a previously determined reference signal strength profile may include a comparison of first time derivatives of the determined signal strength over time and the reference signal strength profile. Trends in the movement of the user when approaching the access control device may thereby be utilized. An improved reliability in controlling the access control device may thereby be achieved.

Figure 2:
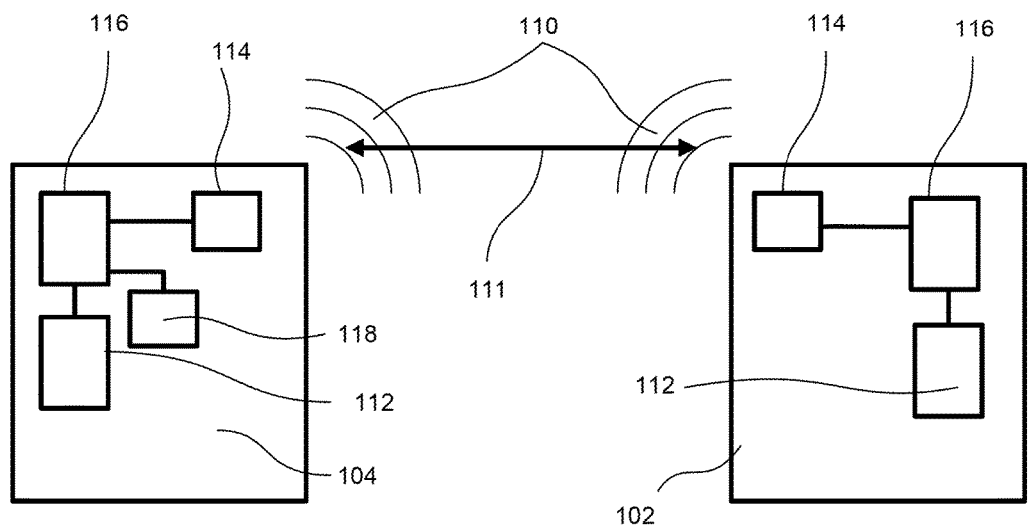
FIG. 2 illustrates a system comprising the portable device and an access control device.

The portable device 104 may comprise an auxiliary sensor 118 for registering its movement and/or orientation, see FIG. 2. The auxiliary sensor 118 may be connected to the processor 116. Input from the auxiliary sensor, may be used to determine the movement of the user 106 of the portable device 104.

Figure 9:
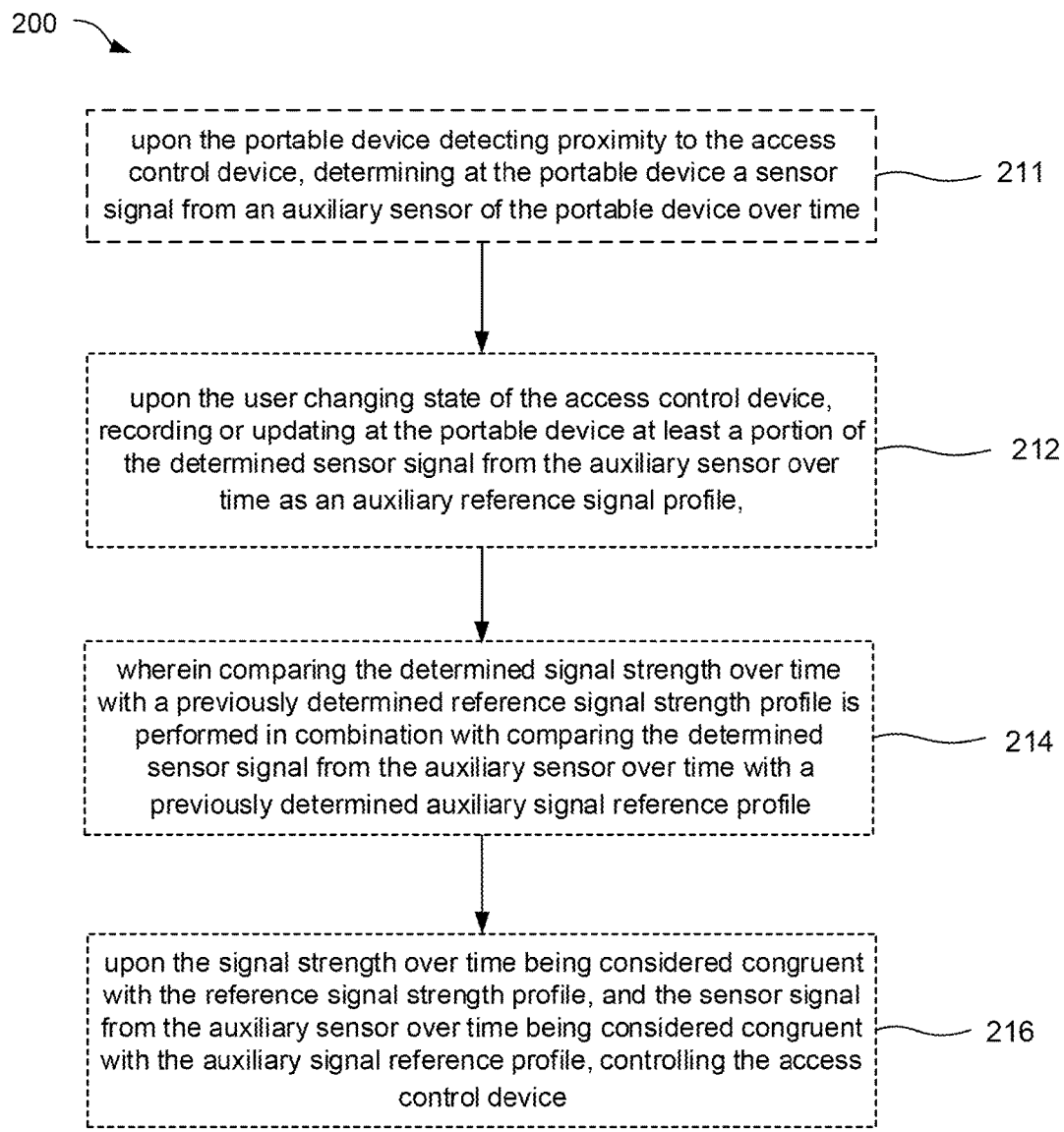
FIG. 9 is a block scheme of a method for controlling access in a system comprising the portable device.

To take advantage of this, the method 200 may further comprise: upon the portable device 104 detecting proximity to the access control device 102, determining 211 at the portable device 102 a sensor signal from the auxiliary sensor 118 of the portable device 104 over time, see the block scheme in FIG. 9. The method 200 further comprising, upon the user 106 changing state of the access control device 102, recording or updating 212 at the portable device 104 at least a portion of the determined sensor signal from the auxiliary sensor 118 over time as an auxiliary reference signal profile. The action of comparing 206 of the determined signal strength over time with a previously determined reference signal strength profile, see FIG. 3, is, moreover, performed in combination with comparing 214 the determined sensor signal from the auxiliary sensor 118 over time with a previously determined auxiliary signal reference profile. The method 200 then comprises, upon the signal strength over time being considered congruent with the reference signal strength profile, and the sensor signal from the auxiliary sensor 118 over time being considered congruent with the auxiliary signal reference profile, controlling 216 the access control device 102.

As mentioned above, the method 200 may be used to address the issue of unintentional triggering of the access control device and still being capable of triggering the access control device well in advance of the user's approach to the object controlled by the access control device thereby avoiding or at least reducing undesirable delay or waiting time for the user.

Figure 8:
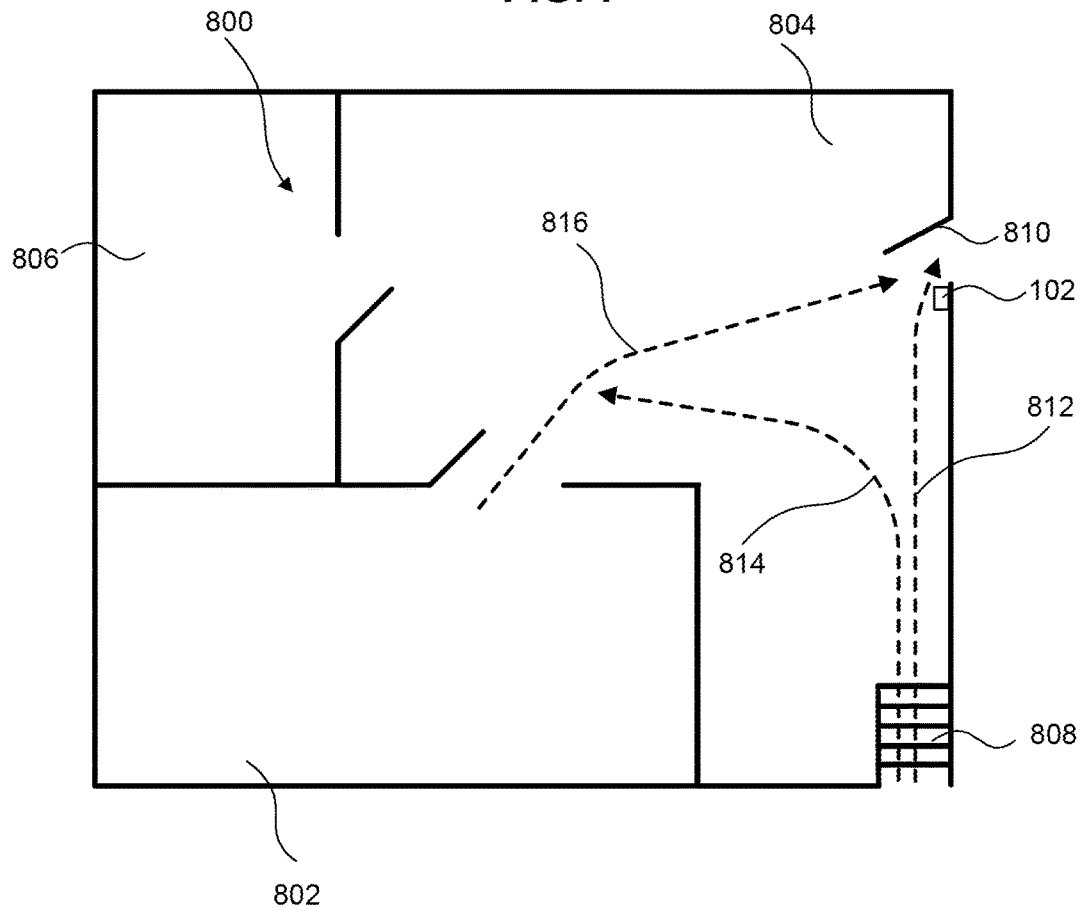
FIG. 8 shows a floor plan of a building.

FIG. 8 shows a floor plan 800 of a building. The floor plan 800 illustrates an office 802 a storage room 806 and a hallway 804. A staircase 808 and a door 810 allows for passage to and from the hallway 804. The door 810 is equipped with an access control device 102 in the form of a door-lock.

Figure 10:
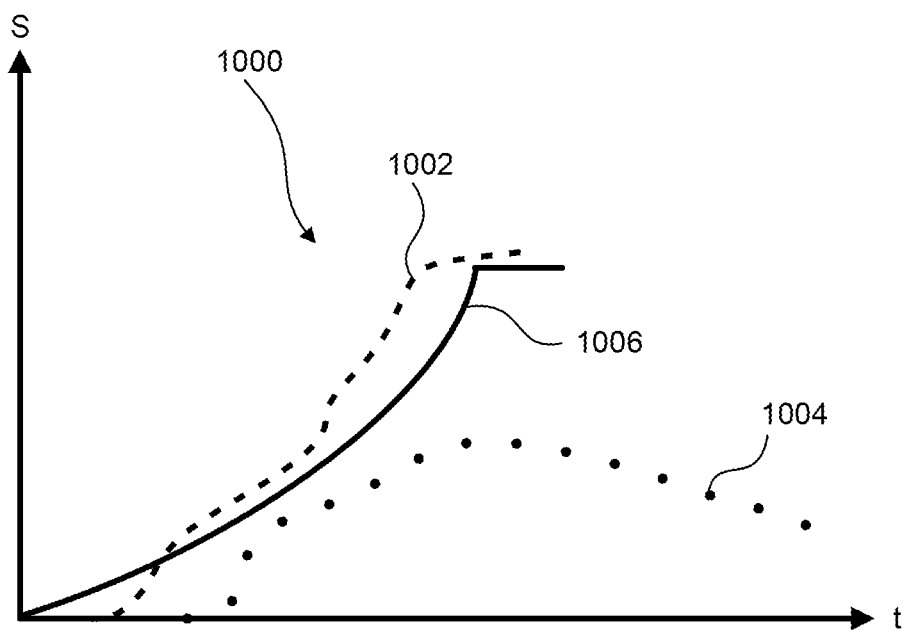
FIG. 10 illustrates a diagram of determined received signal strength as a function of time.

To exemplify this, FIG. 8 illustrates three different movement patterns represented by the dashed arrows 812, 814, and 816. FIG. 10 further illustrates determined signal strengths over time 1002 and 1004 corresponding to the movement patterns 812 and 814, respectively in the diagram 1000 of determined received signal strength, S, as a function of time, t. In FIG. 10 a reference signal strength profile 1006 is also plotted.

Movement pattern 812 illustrates a user approaching the access control 102. The system 100 and method 200 thereby allows for a recording of the signal strength over time 1002 of a signal received from the access control device 102.

The method 200 further compares the determined signal strength over time 1002, i.e. the movement pattern 812, with the previously determined reference signal strength profile. The method 200 thereby allows for control of an access control device 102 by the identified characteristic movement pattern associated with the user. The access control device 102 may further be controlled in this case as the determined signal strength over time 1002 may be considered congruent with the reference signal strength profile 1006. From the comparison it is also possible to extract information on how the user 106 is approaching the door 810. The method 200 thereby allows for triggering of the access control device 102. As a result, the door 810 may be opened by the access control device 102, i.e. the door lock may be unlocked as the user approaches the door 108. The method 100 thereby avoids or at least reduces undesirable delay or waiting time for the user.

Unintentional triggering of the access control device may further be mitigated by the method 200. Movement pattern 814 illustrates such a situation where the user approaches the access control 102, but at a point in time changes direction and moves away from the access control device 102. As a result of the movement 814 a signal strength over time 1004 may be recorded which differs from the signal strength over time 1002. In this case, the determined signal strength over time 1004 is considered, by the method 200, not to be congruent with a reference signal strength profile 1006 whereby the access control device is not controlled. Expressed differently, there is no change in state of the access control device if congruency is not found, resulting in that the door 108 remains locked as the user passes by.

It may also be noted that the movement pattern 816 may give rise to a different determined signal strength over time than for movement pattern 812. The different movement patterns may thereby be used to identify the users as well as to determine an individualized point in time for controlling the control access device, as discussed in relation to FIG. 6.

To summarize, by determining the signal strengths over time 1002 and 1004, and by comparing them with the determined reference signal strength profile 1006 it is possible to differentiate between a first situation where the user is passing the door 810 with the intention to enter for instance into the office 802 and a second situation where the user is approaching the door 810 with the intention to open and pass through it.

To this end, an auxiliary sensor 118 may provide additional information specifying the movement of the user 106 of the portable device 104. Referring to FIG. 8, the auxiliary sensor 118 may be a gyroscope or an accelerometer by which vertical and/or horizontal movements of the portable device 104 may be registered. It is therefore possible to determine if a user has used the stairs 808 or not. The additional information from the auxiliary sensor may thereby assist when distinguishing between different movement patterns such as the movement pattern 812 and 816. The signals from the auxiliary sensor may further be used to identify a user.

The wireless communication between the portable device and the access control device may preferably be via Bluetooth, Bluetooth Low Energy, and/or Zigbee.

The wireless communication between the portable device and the access control device may alternatively, be via Radio Frequency Identification, RFID, Near Field Communication, NFC, FeliCa, ANT+, Z-Wave, ZigBee, Infrared communication or ultrasound.

The wireless communication between the portable device and the access control device may preferably be via Wifi.

The portable device may be a mobile phone, a tablet, a key fob, a smart watch, or a smart bracelet.

It is preferred that the portable device has sufficient computing capability to be able to compare the determined signal strength over time with a previously determined reference signal strength profile. Thereby the access control device may e.g. be a typical electronic lock having wireless communication capability. The intelligence may then reside in the portable device which facilitates physical implementation of the method.

The signal strength over time of a signal received from the access control device is a received signal strength indicator, RSSI, or Received Channel Power Indicator, RCPI.

The person skilled in the art realizes that the present teaching by no means is limited to the preferred embodiments described above. On the contrary, many modifications and variations are possible within the scope of the appended claims.

For example, the comparison of the determined signal strength over time with a previously determined reference signal strength profile may include a comparison of second time derivatives of the determined signal strength over time and the reference signal strength profile.

The detection of proximity of the two devices may be by the portable device determining a signal power and or a trend in signal power of the received signal.

The signal strength over time may be a received signal strength indicator, RSSI which is the measured power present in a received radio signal at a given point in time.

It may be noted, that alternatively the signal strength over time may be RX which is the measured signal power in milliwatts, mW, or decibel-milliwatts, dBm, whereas RSSI is a signal strength percentage, i.e. the higher the RSSI number, the stronger the signal.

The signal strength over time may be received channel power indicator, RCPI. The RCPI is an 802.11 measure of the received radio frequency power in a selected communication channel.

Additionally, variations to the disclosed embodiments can be understood and effected by the skilled person in practicing the claims from a study of the drawings, the disclosure, and the appended claims.

The invention claimed is:

1. A method for controlling access in a system comprising a portable device associated with a user and an access control device, the access control device having a locked and an unlocked state, wherein the portable device and the access control device are configured to wirelessly communicate with each other, the method comprising:
   pairing the portable device and the access control device,
   upon the portable device detecting proximity to the access control device, determining at the portable device a signal strength over time of a signal received from the access control device,
   comparing the determined signal strength over time with a previously determined reference signal strength profile, and
   upon the determined signal strength over time being considered congruent with the reference signal strength profile, controlling the access control device;
   upon the access control device changing state from the locked state to the unlocked state, recording or updating at the portable device at least a portion of the determined signal strength over time as a reference signal strength profile.

2. The method according to claim 1, wherein controlling of the access control device is at a predetermined point in time relative to the reference signal strength profile.

3. The method according to claim 1, wherein the congruency is determined by determining if the signal strength over time is within a predetermined tolerance band over time relative to the reference signal strength profile.

4. The method according to claim 1, the method further comprising setting the portable device in a calibration mode previous to determining at the portable device a signal strength over time of a signal received from the access control device.

5. The method according to claim 1, wherein the method further comprises, while being in the calibration mode, upon the access control device changing state from the locked state to the unlocked state at a plurality of occasions, recording or updating at the portable device the determined signal strength over time as a reference signal strength profile.

6. The method according to claim 5, wherein the recorded or updated reference signal strength profile is a representation of the, at the plurality of occasions, determined signal strengths over time.

7. The method according to claim 5, the method further comprising, after a predetermined number of occasions setting a reference signal strength profile to be used when comparing the determined signal strength over time with a previously determined reference signal strength profile.

8. The method according to claim 5, the method further comprising, after a predetermined number of occasions setting a tolerance band over time relative to the reference signal strength profile, to be used when considering congruency of the determined signal strength over time and a previously determined reference signal strength profile.

9. The method according to claim 5, the method further comprising, in response to differences between reference signal strength profiles determined at different occasions being less than a predetermined tolerance band, setting a reference signal strength profile to be used when considering congruency of the determined signal strength over time and a previously determined reference signal strength profile.

10. The method according to claim 1, wherein comparing the determined signal strength over time with a previously determined reference signal strength profile includes a comparison of first time derivatives of the determined signal strength over time and the reference signal strength profile.

11. The method according to claim 1, the method further comprising:
    upon the portable device detecting proximity to the access control device, determining at the portable device a sensor signal from an auxiliary sensor of the portable device over time,
    upon the user changing state of the access control device, recording or updating at the portable device at least a portion of the determined sensor signal from the auxiliary sensor over time as an auxiliary reference signal profile,
    wherein comparing the determined signal strength over time with a previously determined reference signal strength profile is performed in combination with comparing the determined sensor signal from the auxiliary sensor over time with a previously determined auxiliary signal reference profile, and
    upon the signal strength over time being considered congruent with the reference signal strength profile, and the sensor signal from the auxiliary sensor over time being considered congruent with the auxiliary signal reference profile, controlling the access control device.

12. The method according to claim 1, wherein the wireless communication between the portable device and the access control device is via Bluetooth, Zigbee, Wifi, RFID, NFC.

13. The method according to claim 1, wherein the portable device is a mobile phone, a tablet, a key fob, a smart watch, or a smart bracelet.

14. The method according to claim 1, wherein the signal strength over time of a signal received from the access control device is a received signal strength indicator, RSSI, or Received Channel Power Indicator, RCPI.

* * * * *